(12) United States Patent
Patil et al.

(10) Patent No.: US 8,123,203 B2
(45) Date of Patent: Feb. 28, 2012

(54) VEHICULAR JOUNCE BUMPER ASSEMBLY

(75) Inventors: Ravindra P. Patil, Troy, MI (US);
Joseph A. Schudt, Macomb, MI (US);
Daryl R. Poirier, Davisburg, MI (US);
Robert L. Geisler, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 396 days.

(21) Appl. No.: 12/392,706

(22) Filed: Feb. 25, 2009

(65) Prior Publication Data

US 2010/0213656 A1   Aug. 26, 2010

(51) Int. Cl.
*B60G 13/00* (2006.01)
(52) U.S. Cl. ....................................................... 267/220
(58) Field of Classification Search ................. 267/220, 267/221, 226; 188/321.11
See application file for complete search history.

(56) References Cited

U.S. PATENT DOCUMENTS

| | | | |
|---|---|---|---|
| 6,234,461 B1 * | 5/2001 | Bohm et al. | 267/64.12 |
| 2003/0209395 A1 * | 11/2003 | Fukaya | 188/322.12 |
| 2006/0043659 A1 * | 3/2006 | Gofron et al. | 267/220 |
| 2006/0131119 A1 * | 6/2006 | Ishikawa | 188/321.11 |
| 2007/0119671 A1 * | 5/2007 | Quinn et al. | 188/281 |
| 2008/0179148 A1 * | 7/2008 | Quinn et al. | 188/322.13 |
| 2010/0230877 A1 * | 9/2010 | Schudt et al. | 267/220 |

* cited by examiner

*Primary Examiner* — Christopher Schwartz
(74) *Attorney, Agent, or Firm* — Ingrassia Fisher & Lorenz, P.C.

(57) ABSTRACT

A jounce bumper assembly for a vehicular suspension system, the suspension system having a first member and a second member, is provided. The assembly comprises a mount coupled to the first member, wherein the mount has a cylindrical portion comprising a first cylindrical outer surface. The assembly also comprises a jounce bumper coupled to the second member, and a striker cap having a first end comprising a first cylindrical inner surface circumferentially coupled over the first cylindrical outer surface, and having a second end configured for resilient engagement with the jounce bumper.

19 Claims, 4 Drawing Sheets

VEHICULAR JOUNCE BUMPER ASSEMBLY

TECHNICAL FIELD

The present invention generally relates to vehicular suspension systems, and more particularly relates to a jounce bumper assembly for managing impact load in a vehicular suspension system.

BACKGROUND OF THE INVENTION

Vehicles are typically equipped with suspension systems that include a multitude of springs, linear actuators, damper assemblies such as shock absorbers and/or struts, interconnecting support members, and the like that contract and expand to provide flexible relative movement between the body and chassis. During normal driving conditions, these components gradually dissipate the forces generated by bumps, potholes, and other road surface anomalies in a controlled manner that helps the driver to maintain control over the vehicle and provides passengers a comfortable driving environment.

However, severe impact events can impose excessive loading on a suspension causing it to contract beyond the designed operating range of springs and shocks/struts. Excessive jounce, or downward motion of the body toward the chassis, can lead to potentially damaging collisions between suspension components and/or other undercarriage elements. To prevent such damage, many suspension systems employ impact load management systems that limit jounce. Such systems typically include jounce bumper assemblies configured to engage during severe impact events and provide a "bottoming" or a limit to further contractive motion. These assemblies may be used to limit jounce between, for example, sprung and unsprung vehicle masses and may be conveniently located within the body of a shock or strut. Such integrated assemblies typically include a rigid metallic striker plate coupled to the end cap of the damper tube and a polyurethane foam-based or rubber jounce bumper coupled to the upper mount. Each is aligned along a common piston rod and spaced apart so that, during an impact event, the striker cap and jounce bumper engage causing the bumper to deform axially along the piston rod in the direction of loading. However, such a configuration provides little cushioning effect from impact loads because of the rigidity of the striker plate and the marginal capacity of the foam bumper to absorb associated energy. As a result, striker plates, jounce bumper mounts, and/or other rigid impacting surfaces can receive the brunt of impact loads making them susceptible to damage. Accordingly, these and other similarly affected elements including the chassis frame and vehicle body structure are generally designed with a more rugged construction of greater mass and volume than would otherwise be required if the jounce bumper assembly were more energy absorbing. Such a design adds to the overall weight and expense of damper assemblies, and reduces their space efficiency.

Accordingly, it is desirable to provide a jounce bumper assembly for managing impact load in a vehicular suspension system that enables the use of lighter weight supporting materials without adversely impacting other desirable vehicle characteristics such as driving comfort or vehicle controllability. Further, it is also desirable if such a system has improved space efficiency whether loaded or unloaded and improved geometric stability under loading. Furthermore, it is also desirable if such a geometrically stable design provides improved energy absorption and reduced peak strain. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In accordance with an embodiment, by way of example only, a jounce bumper assembly for a vehicular suspension system, the suspension system having a first member and a second member, is provided. The assembly comprises a mount coupled to the first member, wherein the mount has a cylindrical portion comprising a first cylindrical outer surface. The assembly also comprises a jounce bumper coupled to the second member, and a striker cap having a first end comprising a first cylindrical inner surface circumferentially coupled over the first cylindrical outer surface, and having a second end configured for resilient engagement with the jounce bumper.

DESCRIPTION OF THE DRAWINGS

A more complete understanding of the present invention may be derived by referring to the detailed description and claims when considered in conjunction with the following figures, wherein like reference numbers refer to similar elements throughout the figures.

DESCRIPTION OF AN EXEMPLARY EMBODIMENT

The various embodiments of the present invention described herein provide a jounce bumper assembly for managing impact load for a vehicular suspension suitable for limiting jounce between suspension members such as, for example, sprung and unsprung vehicle masses. When integrated within the housing of a suspension damper such as a shock absorber or strut, the assembly includes a flexible striker cap in axial alignment with a jounce bumper along a piston rod. The flexible cap is configured to be coupled overlapping the side of a cylindrical mount such as a damper tube or a rigid striker cap. During impact events, the flexible cap and the jounce bumper engage deformably, absorbing energy generated by the impact load. The overlapping configuration reduces the volume required for the flexible cap, providing additional volume for axial deformation thereby. In other embodiments, an annular rubber sleeve is mounted over an outer surface of the flexible cap to preserve geometric stability and prevent the flexible cap from buckling by reducing peak strain during impact loading enabling a further increase in energy absorption.

Figure 1:
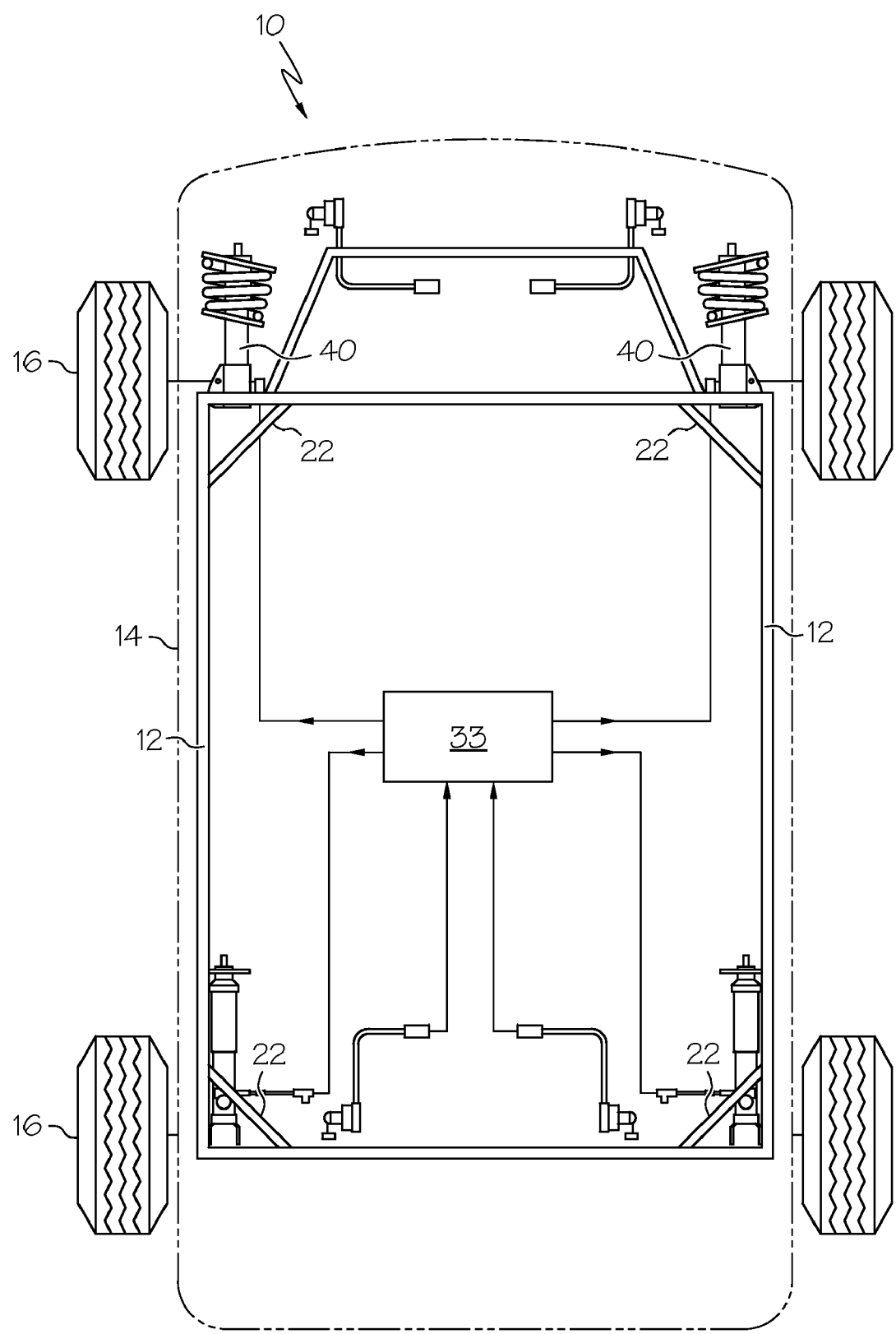
FIG. 1 is a schematic view of an exemplary vehicle illustrating the manner in which an embodiment is integrated with various sub-components of the vehicle.

FIG. 1 is a schematic illustration of a vehicle 10 (e.g., an automobile) for use in conjunction with one or more embodiments of the present invention. Vehicle 10 includes a chassis 12, a body 14, four wheels 16, a suspension assembly 22, and a chassis control module (or CCM) 33. Body 14 is arranged on chassis 12 and substantially encloses the other components of vehicle 10. Body 14 and chassis 12 may jointly form a frame. The wheels 16 are each rotationally coupled to chassis 12 near a respective corner of body 14. Suspension assembly 22 is configured to provide a damped and stabilized coupling between a sprung vehicle mass including body 14, and an unsprung mass including wheels 16 and a portion of chassis 12. Suspension assembly 22 may include springs, linear actuators, control arms or links, and other interconnecting and supporting members, and further includes at least one damper assembly 40 such as a shock absorber or a strut, or the like, for providing dampening to motion between sprung and unsprung vehicle masses. Damper assembly 40 may be configured for passive response, or may be designed to respond actively by making adjustments to suspension assembly 22 on command from CCM 33 depending on road surface conditions in real time to stabilize body 14. Damper assembly 40 also contains an impact load management system that includes an integrated jounce bumper assembly to be described in greater detail below. This assembly is configured to absorb energy in a space efficient manner during suspension impact events caused by excessive jounce.

Vehicle 10 may be any of a variety of vehicle types, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). Vehicle 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, or a fuel cell, a combustion/electric motor hybrid engine, and an electric motor.

Figure 2:
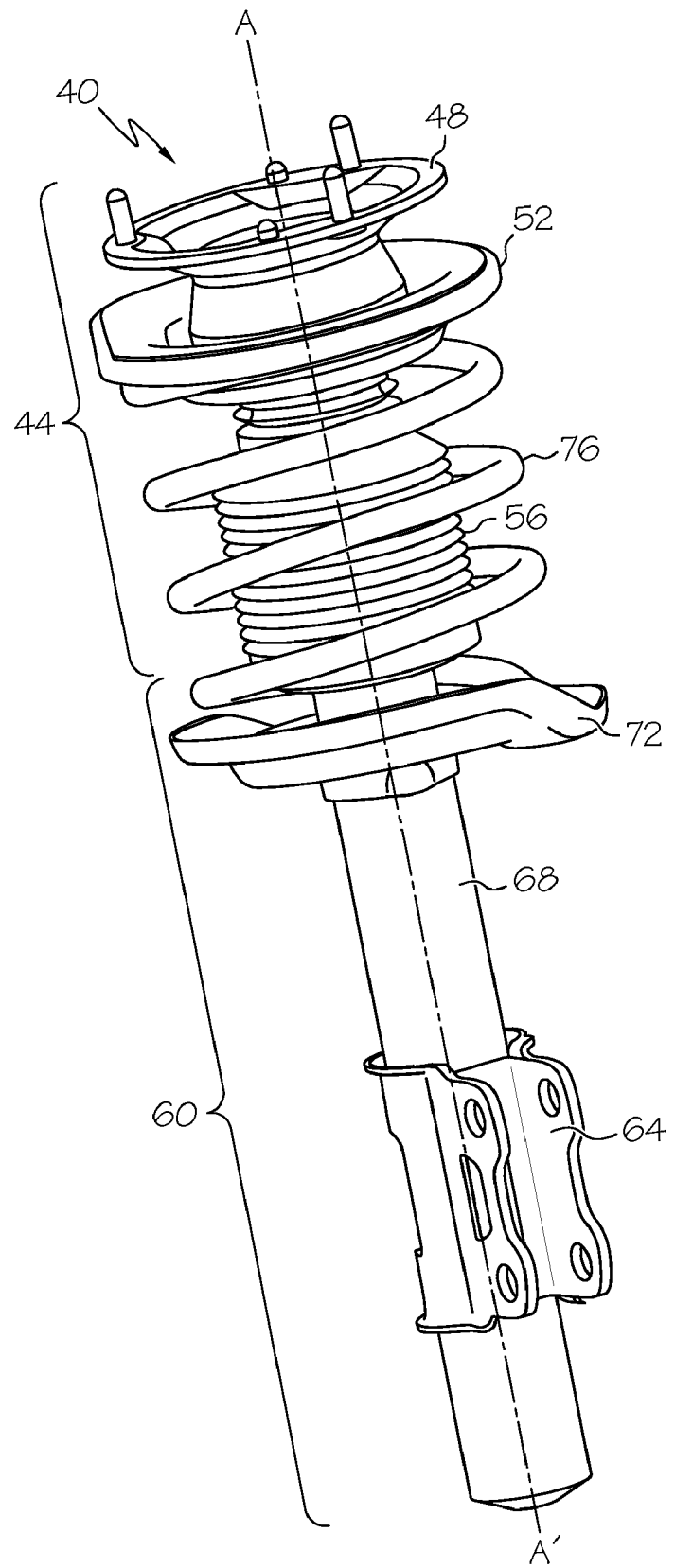
FIG. 2 is a schematic view of an exemplary suspension damper assembly for use with the vehicle depicted in FIG. 1, and suitable for use with an integrated jounce bumper assembly in accordance with another exemplary embodiment.

FIG. 2 is a schematic illustration of damper assembly 40 suitable for housing an integrated jounce bumper assembly in accordance with an exemplary embodiment. Damper assembly 40, which may comprise a shock absorber, a strut, or the like, is attached between any two suitable components of suspension assembly 22 (FIG. 1) to dampen relative motion therebetween, such as, most commonly, sprung and unsprung vehicle masses. Assembly 40 has a first portion 44 that includes an upper mounting bracket 48, an upper spring seat 52, and a dust tube or dust boot 56, and a second portion 60 that includes a lower mounting bracket 64, a cylindrical damper tube 68, and a lower spring seat/retainer 72. First and second portions 44 and 60 are each substantially rigidly attached to suitable suspension members (not shown) such as, for example, sprung and unsprung vehicle masses using upper and lower mounting brackets 48 and 64, respectively, in conjunction with fasteners in a conventional manner. Damper assembly 40 also includes a coil spring 76 circumferentially disposed about first and second portions 44 and 60, and aligned substantially parallel to damper tube 68. Coil spring 76 is bounded between and retained in place by upper spring seat 52 and lower spring seat/retainer 72. When vehicle 10 is in motion, first and second portions 44 and 60 expand and contract relative to each other along an axis A-A' (axial motion) substantially parallel to damper tube 68 dampening such relative motion. Coil spring 76 provides resilient forces as necessary tending to restore an equilibrium relative height between sprung and unsprung masses. Damper assembly 40 also includes an integrated jounce bumper assembly described in detail below, configured to absorb energy and limit jounce between these masses during impact events.

Figure 3:
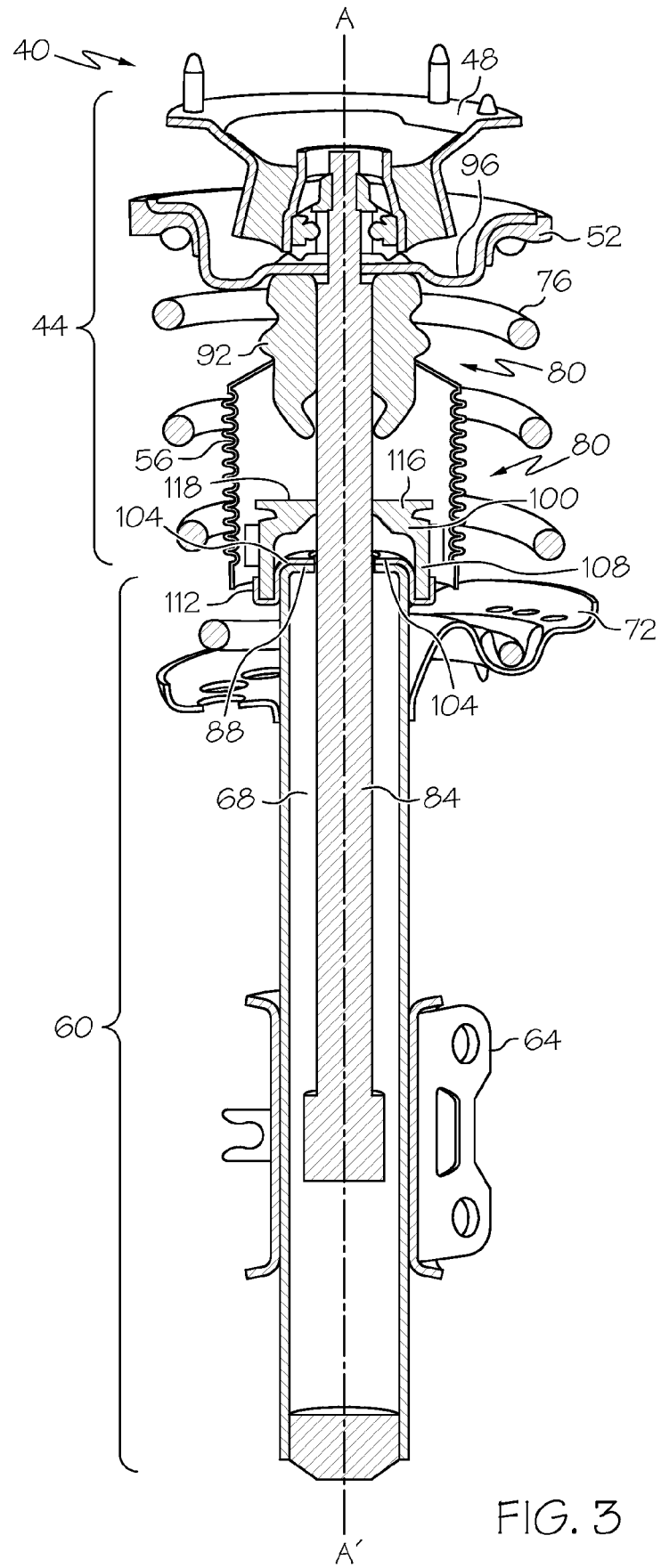
FIG. 3 is a cross-sectional view of the suspension damper assembly depicted in FIG. 2 illustrating elements of the exemplary jounce bumper assembly.

FIG. 3 is a cross-sectional view of damper assembly 40 illustrating an integrated jounce bumper assembly 80 in accordance with the exemplary embodiment. First portion 44 of damper assembly 40 includes upper mounting bracket 48, upper spring seat 52, and dust boot 56, and second portion 60 includes lower mounting bracket 64, cylindrical damper tube 68, and lower spring seat/retainer 72. Assembly 40 is conventionally mounted between two suitable suspension members (not shown) using brackets 48 and 64. Coil spring 76 circumscribes portions of assembly 40 and is retained by upper and lower spring seats 52 and 72. Assembly 40 also includes an axially oriented (parallel to axis A-A') strut rod or piston rod 84 rigidly coupled to upper mounting bracket 48. Rod 84 is slidably coupled to damper tube 68 through an opening in a substantially flat top end 88 disposed at an upper end thereof.

Damper assembly 40 also has an integrated jounce bumper assembly 80 that includes a jounce bumper 92, an upper mount 96, a flexible striker cap 100, and a rigid striker cap 104. Jounce bumper 92 may comprise any suitable flexible material such as, for example, polyurethane foam rubber. Bumper 92 is attached to upper mount 96, and is circumscribed about and moves axially with rod 84. Flexible striker cap 100 may comprise any suitable flexible material such as, for example, a thermoplastic or thermosetting elastomeric polymer. In one embodiment, flexible striker cap 100 comprises a thermoplastic polyurethane (TPU) foam. Rigid striker cap 104 may comprise any suitable structurally rigid material such as any steel alloy including stainless steel. Rigid striker cap 104 is conformably coupled to damper tube top end 88 and moves axially in unison therewith, and has an opening for slidable coupling to rod 84. Flexible striker cap 100 circumscribes and is slidably coupled to rod 84, and has an annular cylindrical base portion 108 disposed overlapping an outer cylindrical surface of rigid striker cap 104 which acts as a mount for flexible cap 100. Rigid cap 104 has a retention element 112 configured to receive and provide axial support to base portion 108. Flexible cap 100 also has an upper portion 116 including a substantially flat upper flange 118 configured to engage jounce bumper 92 during impact events.

During operation, rod 84 oscillates in and out of damper tube 68 in a well known manner to dampen relative motion between connecting suspension members. Coil spring 76 also compresses and expands resiliently in concert with these oscillations. During normal driving conditions that do not produce excessive jounce, jounce bumper 92 and flexible striker cap 100 remain separated by a distance that varies in accordance with the relative motion between rod 84 and damper tube 68. During an impact event characterized by excessive jounce, jounce bumper 92 and flexible striker cap 100 deformably engage, absorbing at least part of the energy generated by the impact. This contractive motion may continue accompanied by additional deformation and increased resilience until bumper 92 and flexible cap 100 each reach a maximum axial deformation. For particularly severe impact events wherein such maximum deformation is achieved, further jounce motion is prevented by the rigidity of upper mount 96 and rigid striker cap 104. The overlapping of base portion 108 with the outer cylindrical surface of rigid striker cap 104 reduces the overall stack height or vertical space required by flexible striker cap 100 enabling greater energy absorption per unit volume. Retention element 112 maintains the axial position of flexible cap 100 over rigid cap 104 during impact by providing support thereto. Element 112 also provides a means of transferring the downward force of an impact from flexible cap 100 to rigid cap 104, damper tube top end 88, and ultimately to damper tube 68.

Figure 4:
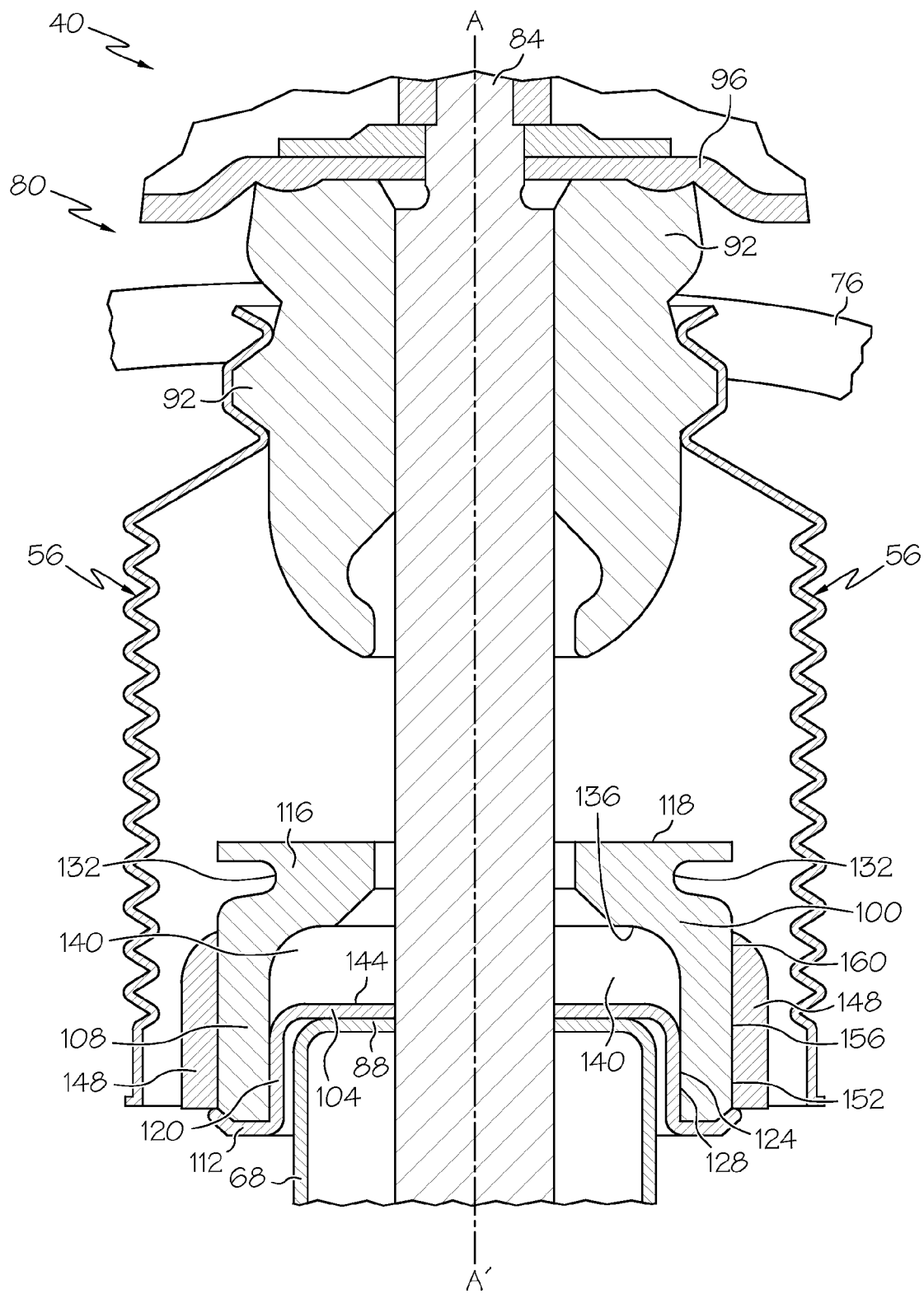
FIG. 4 is a magnified cross-sectional view of the jounce bumper assembly integrated into the suspension damper assembly depicted in FIGS. 2 and 3.

FIG. 4 is a magnified cross-sectional view of a portion of damper assembly 40 including jounce bumper assembly 80 in accordance with the exemplary embodiment. Jounce bumper assembly 80 includes jounce bumper 92, upper mount 96, flexible striker cap 100, and rigid striker cap 104. Jounce bumper 92 is rigidly coupled to upper mount 96, and circumscribes and follows the axial motion of rod 84. In one embodiment, as shown, rigid striker cap 104 is included having a cylindrical side wall 120 that fits substantially conformably over damper tube 68 proximate top end 88. In another embodiment (not shown), rigid striker cap 104 is not used, and damper tube 68 is terminated by top end 88 which may include an end cap. Cylindrical side wall 120 is coupled with retention element 112 that extends radially outward (orthogonal to axis A-A') from damper tube 68. Flexible striker cap 100 includes base portion 108 and upper portion 116, both integrally formed with each other and open in the center to provide for slidable coupling to rod 84. As used herein, the term "integrally formed" means that a first element, (such as base portion 108) extends or transitions in a continuous manner from a second element, (such as upper portion 116) and not as two separate and distinguishable elements. Base portion 108 has a cylindrical inner surface 124 circumferentially coupled over a cylindrical outer surface 128 of cylindrical side wall 120.

Upper portion 116 includes upper flange 118 configured to engage jounce bumper 92 during impact events, and an undercut notch 132 proximate upper flange 118 and radially circumscribed about upper portion 116. Upper portion 116 is also configured with a concavity 136 that may be contoured with a variety of convolutions depending upon the manner in which flexible cap 100 is designed to deform. Concavity 136 forms a void 140 between upper portion 116 and a top surface 144 of rigid striker cap 104. The axial height of overlap between cylindrical inner surface 124 and cylindrical outer surface 128 may be any suitable distance and generally will be based upon the desired volume of void 140 and the nature of the attachment mechanism between base portion 108 and retention element 112. Accordingly, the shape of void 140 may be adjusted as a means of varying the amount of axial deformation that upper portion 116 is designed for.

During an impact event, jounce bumper 92 engages upper flange 118 causing upper portion 116 to deform downwardly into void 140. While deformed, flexible striker cap 100 behaves in a spring-like manner absorbing energy from the impact load thereby. The overlapping of cylindrical inner surface 124 with cylindrical outer surface 128 provides a stabilized base mount for flexible cap 100 that reduces the required stack height of the assembly. Such a configuration improves space efficiency while enabling greater capacity for energy absorption. This capacity is augmented by undercut notch 132 which computer models and empirical studies have demonstrated stabilizes upper flange 118 during impact events allowing upper portion 116 to deform in a more linear manner, enabling greater energy absorption per unit of compression. Undercut notch 132 also shifts the peak strain under load to varying points within flexible cap 100 depending, at least in part, upon the magnitude of the load, enhancing the durability of flexible cap 100 thereby. Retention element 112 maintains the axial position of flexible cap 100 and thereby the volume/shape of void 140 by preventing cap 100 from being forced farther onto rigid cap 104 by impacting force from jounce bumper 92.

Flexible striker cap 100 also deforms radially during impacting events, generating hoop stress within base portion 108 that tends to cause an outward bulge therein. During particularly severe impact events, base portion 108 may bulge excessively allowing upper portion 116 to buckle, significantly reducing the energy absorption capacity of flexible cap 100 thereby. To restrict such radial strain and prevent buckling, in another embodiment, flexible striker cap 100 is reinforced by an annular cylindrical rubber sleeve 148 having an inner surface 152 circumferentially coupled over a cylindrical outer surface 156 of base portion 108. In a further embodiment, rubber sleeve inner surface 152 is circumferentially coupled over parts of both cylindrical outer surface 156 of base portion 108 and a cylindrical outer surface 160 of upper portion 116. Rubber sleeve 148 may comprise any suitable elastomeric polymer including thermosetting elastomers and thermoplastic elastomers, and is configured to prevent geometric instability in flexible cap 100 by restraining base portion 108 and/or upper portion 116 from radial expansion. This restraint reduces the strain of flexible cap 100 preventing it from buckling during loading, improving its structural stability and enhancing energy absorption thereby without additional stack height.

The various embodiments of the present invention described herein provide a jounce bumper assembly for managing impact load for a vehicular suspension having improved energy absorption and resistance to strain during impact events. The assembly is well suited for integration within a damper assembly such as a shock absorber or strut, and enables the use of lighter weight materials associated with jounce-related impact such as upper mounts, rigid striker caps, and damper tube top ends, without adverse impact to driving comfort or vehicle controllability. The overlapping coupling of the flexible striker cap to the top end of the damper tube reduces the amount of axial volume occupied by the flexible cap in both loaded and unloaded states. The undercut notch in the flexible cap enhances cap durability by varying the location of peak strain therein depending on loading. Incorporation of a sleeve onto the assembly reinforces the flexible cap by absorbing hoop stress and preventing the flexible cap from excess radial strain and buckling during loading. This reinforcement helps the flexible cap retain geometric stability enabling improved space efficiency during loading providing for enhanced energy absorption and reduced peak strain even during highly compressive impact events.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention and the legal equivalents thereof.

What is claimed is:

1. A jounce bumper assembly for a vehicular suspension system, the suspension system having a first member and a second member, the assembly comprising:
   a mount coupled to the first member, the mount having a cylindrical portion comprising a first cylindrical outer surface;
   a jounce bumper coupled to the second member; a striker cap having a first end comprising a first cylindrical inner surface circumferentially coupled over the first cylindrical outer surface and a second cylindrical outer surface, and having a second end configured for resilient engagement with the jounce bumper; and an annular sleeve comprising a second cylindrical inner surface circumferentially coupled over the second cylindrical outer surface for restraining the first end of the striker cap from radial expansion when the jounce bumper engages the second end of the striker cap.

2. An assembly according to claim 1, wherein the striker cap comprises a thermoplastic polymer.

3. An assembly according to claim 2, wherein the striker cap comprises a thermoplastic polyurethane.

4. An assembly according to claim 1, further comprising a damper tube coupled between the first member and the mount.

5. An assembly according to claim 1, further comprising a retention element coupled to the first cylindrical outer surface configured to receive and provide axial support to the first end of the striker cap.

6. An assembly according to claim 1, wherein the striker cap further comprises an undercut notch.

7. An assembly according to claim 1, wherein the annular sleeve comprises an elastomeric polymer.

8. An assembly according to claim 1, wherein the suspension system further comprises a sprung mass and an unsprung mass, and wherein the mount is coupled to one of the sprung mass or the unsprung mass, and the jounce bumper is coupled to the other of the sprung mass or the unsprung mass.

9. An assembly according to claim 1, wherein the striker cap comprises a thermosetting polymer.

10. A damper assembly for a vehicular suspension system, the suspension system having a first member and a second member, the assembly comprising:
   a rigid striker cap coupled to the first member, the rigid cap having a first cylindrical outer surface and a retention element;
   a flexible striker cap having a first end and a second end, the first end comprising a first cylindrical inner surface circumferentially coupled over the first cylindrical outer surface and engaging the retention element of the rigid striker cap; and
   a jounce bumper coupled to the second member, and wherein the second end of the flexible striker cap is configured between the rigid striker cap and the jounce bumper for radial expansion upon resilient engagement with the jounce bumper.

11. An assembly according to claim 10, wherein the first end of the striker cap further comprises a second cylindrical outer surface, and further comprising an annular sleeve comprising a second cylindrical inner surface circumferentially coupled over the second cylindrical outer surface, the annular sleeve for restraining the first end of the striker cap from radial expansion when the jounce bumper engages the second end of the striker cap.

12. An assembly according to claim 11, wherein the annular sleeve comprises an elastomeric polymer.

13. An assembly according to claim 12, wherein the annular sleeve comprises a thermoplastic elastomeric polymer.

14. An assembly according to claim 12, wherein the annular sleeve comprises a thermosetting elastomeric polymer.

15. An assembly according to claim 10, wherein the second end further comprises a flange configured to engage the jounce bumper.

16. An assembly according to claim 15, wherein the striker cap further comprises an undercut notch proximate the flange.

17. An assembly according to claim 10, wherein the second end of the striker cap further comprises a concavity, and the rigid cap further comprises an end surface, and wherein the concavity and the end surface form a void therebetween when the first cylindrical inner surface is circumferentially coupled over the first cylindrical outer surface.

18. A suspension system comprising:
   a first member;
   a second member;
   a damper tube having a cylindrical outer surface, and having a first end coupled to the first member, and having a second end; and
   a jounce bumper assembly comprising:
      a jounce bumper coupled to the second member;
      a striker cap configured for resilient engagement with the jounce bumper, and having a cylindrical sidewall for circumferentially engaging the second end of the damper tube; and
      a restraining sleeve substantially surrounding and engaging the cylindrical sidewall and restraining the striker cap from radial expansion when the jounce bumper engages the striker cap.

19. A system according to claim 18, wherein the striker cap further comprises an undercut notch.

* * * * *